United States Patent [19]

Donner

[11] 3,835,300

[45] Sept. 10, 1974

[54] WEB-READING SYSTEM WITH REPLACEABLE DRUM

[75] Inventor: Siegmar Donner, Augsburg, Germany

[73] Assignee: Fa. Kleindienst & Co., Augsburg, Germany

[22] Filed: Oct. 12, 1972

[21] Appl. No.: 296,961

[30] Foreign Application Priority Data

Nov. 24, 1971 Germany............................ 2158302

[52] U.S. Cl.................... 235/61.11 E, 250/219 D, 250/219 DD

[51] Int. Cl. .............................................. G06k 7/10

[58] Field of Search .............. 235/61.11 E, 61.11 R; 250/219 DD, 219 R, 219 D; 346/74 MD; 340/174.1 C; 350/190

[56] References Cited

UNITED STATES PATENTS

| | | | |
|---|---|---|---|
| 1,939,215 | 12/1933 | Kuno | 235/61.11 E |
| 3,216,132 | 11/1965 | Flaherty et al. | 235/61.11 E X |
| 3,351,744 | 11/1967 | Masterson | 250/219 DD |
| 3,360,652 | 12/1967 | Bernous | 250/219 DD |
| 3,430,033 | 2/1969 | Reed | 235/61.11 E |
| 3,549,827 | 12/1970 | Willcox et al. | 350/190 UX |
| 3,627,990 | 12/1971 | Sallach | 235/61.11 E |

FOREIGN PATENTS OR APPLICATIONS

| | | | |
|---|---|---|---|
| 427,136 | 1935 | Great Britain | 250/219 DD |

OTHER PUBLICATIONS

IBM Technical Disclosure Bulletin, Hulsizer et al., "Program Control Device," Vol. 11, No. 1, 6/1968, p. 81, 82.

*Primary Examiner*—Thomas J. Sloyan
*Attorney, Agent, or Firm*—Karl F. Ross; Herbert Dubno

[57] ABSTRACT

The invention relates to a drum which is removable from conveying means in an optical or electronic reading system for documents, the drum having means for mounting on its surface a test document so that when the drum is replaced in the conveying means the test document can be constantly read whereby faults can be detected or the system can be adjusted.

2 Claims, 4 Drawing Figures

WEB-READING SYSTEM WITH REPLACEABLE DRUM

The present invention relates to a drum, particularly for the conveyance of documents in optical reading systems.

In the known document-conveying installations, drums of this kind may be used either in the form of transport or conveyor drums, in which case they are used for changing the direction of the documents in non-linear conveyors, or they may be used in the form of reading drums, in which case they guide the documents past an optical reading system on a constant circular path while simultaneously varying the direction of conveyance.

It is also known to use drums provided directly above an optical reading system upon linear conveyance of documents. The drums are generally combined with a holding-down device for the purpose of maintaining a defined maximum distance between the conveyed document and the optical reading system. The drums are thus always designed and used chiefly for conveying and reading operations. Optical and electronic systems thus have to be tested either by inserting documents, or a second reading head mounted on a special test drum has to be connected to the electronic evaluation system. Tests of this kind are costly and time-consuming operations.

It is an object of the invention to provide in a document conveying device, simple and inexpensive means facilitating constant reading.

It is also an object of the invention to provide a quicker and simpler testing of the optical and electronic systems, so as to provide quicker and better servicing than before.

According to yet another object of the invention, a convex surface of the drum is provided extending in the zone of the reading area of an optical reading system and said drum is adapted to be readily removable and insertable and a test document or the like may be secured to its convex surface.

As a yet further object, the invention provides a drum which thus serves simultaneously as a conveying and testing element which may be readily removed from or reintroduced into its bearing after a test document has been secured to its periphery, for example by means of cellotape.

As a yet further object of the invention the drum may be held in its bearing so as to be releasable by pulling a bearing pin thus facilitating its quick and easy replacement. The bearing pin extends advantageously over the whole possible height of reading thus enabling even the largest documents read by the optical reading system to be applied to the periphery of the drum.

In one modification of the invention, the distance of the optical reading system equals the distance Of the paper-guiding surface, the paper-guiding surface proper being thus tangent to the convex surface of the drum.

These and other object and advantages of the invention will become apparant from reading the following description in conjunction with the attached diagrammatic drawings which are non-limitative of the invention and wherein.

Figure 1:
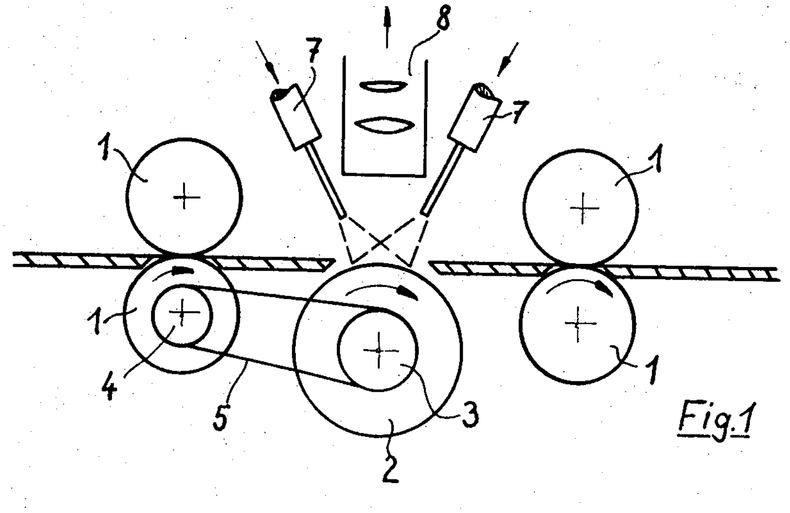
FIG. 1 shows a test drum with an optical reading system.

Referring to the drawings, a test drum 2 for an optical reading system forms part of a conveying system and is driven by one of two conveyor rollers 1 through a transmission 3 and 4 with the aid of an endless belt or cord 5 or the like. The transmission 3 and 4 is so constructed as to ensure that the peripheral speed of the test drum 2 corresponds substantially exactly to the peripheral speed of the linear conveyor comprising a conveyor plate or the like 6 and the two conveyor rollers 1. The test drum 2 is mounted in the conveying system exactly concentrically below the optical reading system that is, its eentre lies in the same plane as that in which the optical axis of the optical reading system lies. The test drum is cylindrical and the radius thereof is equal to the distance of the optical reading system from the drum surface.

Figure 4:
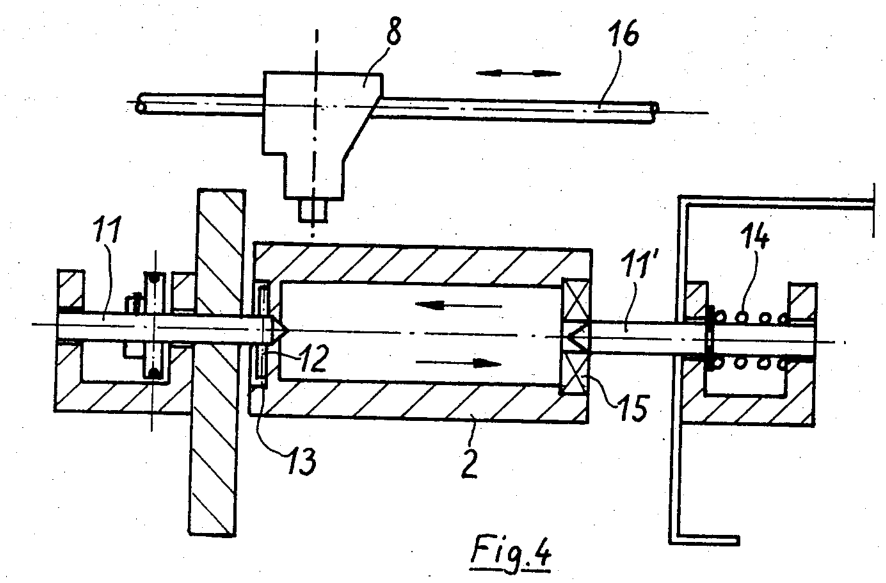
FIG. 4 shows a vertical section through a bearing for the drum.

Light sources 7 directed towards the test drum 2 for illuminating the documents are provided in known manner on the left and on the right of the optical reading system 8, which may be reciprocable In a guide rail 16 as seen in FIG. 4.

Figure 2:
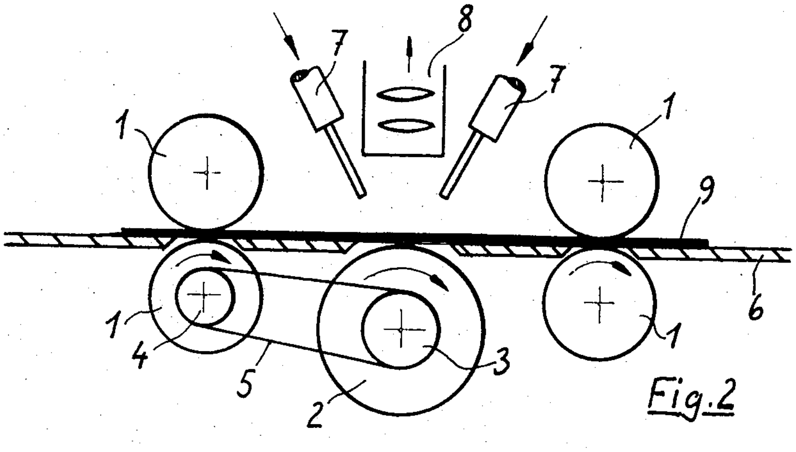
FIG. 2 shows a test drum with an optical reading system and a document conveyed on a linear conveyor.

The test drum 2 can support a document 9 (FIG. 2), generally describable as an "information-carrier web," conveyed on the linear conveyor plate 6, at a definite maximum distance from the optical reading system 8, the test drum 2 being mounted in such manner that the (convex) surface of the drum is exactly level with, or lies in the same plane as, the surface of the conveyor plate 6.

Figure 3:
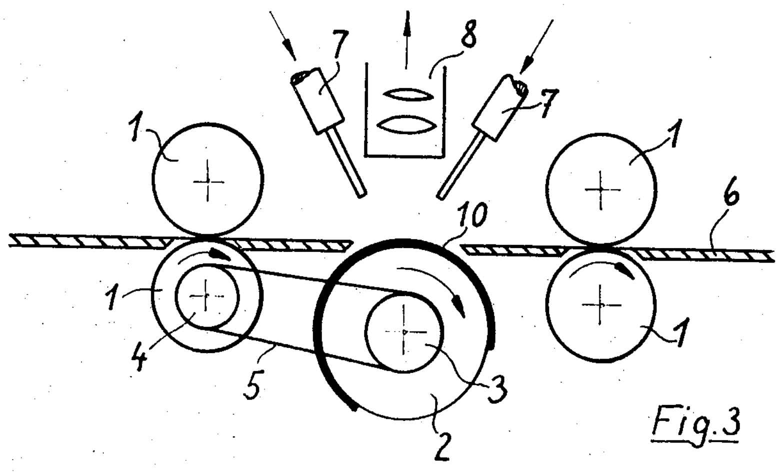
FIG. 3 shows a test drum with an optical reading system and a document in position on the test drum.

FIG. 3 shows a test document 10 mounted in position on the surface of the test drum 2.

FIG. 4 illustrates a bearing for the test drum 2 and replacement of the test drum. The test drum 2 is mounted between two bearing pins or bolts 11 and 11' and is centered on points on these bearing bolts. A driving wheel comprising the part 3 of the transmission 3 and 4 is secured to the bearing bolt 11. The test drum 2 is driven by a pin 12 extending into and engaging a slot 13 provided in the test drum 2. The bearing bolt 11', which may be reciprocated from left to right as viewed in FIG. 4, is urged in the direction of the bearing or of a ball bearing or ball race 15 by a pressure spring 14. The test drum 2 may thus be readily removed from and inserted into the optical reading system by retraction of the bearing bolt 11' to the right.

A drum embodying the invention thus facilitates the testing of connected optical and electronic systems for full performance capacity within a minimum time. The drum may be quickly replaced, either by a second drum to which a test document has been previously applied being inserted, or by a piece of the test document or a whole document being stuck, for example by means of cellotape, to the withdrawn drum, which is then replaced in the system for test purposes. Other means for ounting the test document on the drum surface may be utilised.

In either case, the symbols on the test document may be constantly read after re-insertion of the drum. This is of decisive assistance, for example, to maintenance engineers in the testing, location of faults, or adjustment carried out in connected electronic reading systems or other control systems.

I claim:

1. In a system for the evaluation of an information-carrier web which comprises a substantially horizontal table formed with an opening, feed means for advancing said web along said table across said opening, and information-reading means disposed above said opening, the improvement which comprises: a cylindrical test drum received in said opening and mounted below the surface of said table with the cylindrical surface of said drum extending through said opening substantially to a plane thereof whereby the plane of the surface is substantially tangent to said cylindrical surface, said cylindrical surface being formed with indicia detectable by said information-reading means to enable the testing thereof in the absence of said web; means below said table enabling replacement and withdrawal of said drum by motion thereof; and drive means for operatively connecting said drum to said feed means for displacement of said cylindrical surface of said drum substantially at a rate of displacement corresponding to that of that web to thereby replace the repeated feed of a separate web when test patterns must be reproduced.

2. In a system for the evaluation of an information-carrier web which comprises a substantially horizontal table formed with an opening, feed means for advancing said web along said web along said table across said opening, and information-reading means disposed above said opening, the improvement which comprises: a cylindrical test drum received in said opening and mounted below the surface of said table with the cylindrical surface of said drum extending through said opening substantially to a plane thereof whereby the plane of the surface is substantially tangent to said cylindrical surface, said cylindrical surface being formed with indicia detectable by said information-reading means to enable the testing thereof in the absence of said web; means below said table for removably mounting said drum; and drive means for operatively connecting said drum to said feed means for displacement of said cylindrical surface of said drum substantially at a rate of displacement corresponding to that of said web, said information-reading means being an optical system having an optical axis disposed in a vertical plane of the axis of said drum and spaced therefrom by a distance equal substantially to the radius of said drum, said means for removably mounting said drum including a fixed bearing engageable with one side of said drum and a mountable bearing axially shiftable parallel to the axis of said drum and releasably engaging the other end thereof to enable withdrawl and replacement of said drum.

* * * * *